United States Patent [19]
Jackson et al.

[11] 3,775,836
[45] Dec. 4, 1973

[54] SHAFT SEAL METHOD OF MANUFACTURING

[75] Inventors: Richard H. Jackson, Downers Grove; Dale J. Warner, Chicago, both of Ill.

[73] Assignee: Gits Bros. Mfg. Co., Inc., Chicago, Ill.

[22] Filed: Aug. 7, 1972

[21] Appl. No.: 278,599

Related U.S. Application Data

[62] Division of Ser. No. 108,850, Jan. 22, 1971, Pat. No. 3,718,336.

[52] U.S. Cl.................. 29/483, 29/148.45, 29/501
[51] Int. Cl................................................. B23k 1/20
[58] Field of Search................. 29/483, 501, 482, 29/478, 479, 148.4 S, DIG. 34; 277/40

[56] References Cited
UNITED STATES PATENTS

| | | |
|---|---|---|
| 2,040,092 | 5/1936 | Leedy ............................ 29/501 X |
| 2,050,728 | 8/1936 | Ost ................................. 29/501 X |
| 2,440,298 | 4/1948 | Ronay et al ..................... 29/501 X |
| 2,706,328 | 4/1955 | Karmazin ........................ 29/483 X |
| 3,109,659 | 11/1963 | Gits et al. ........................ 277/91 X |
| 3,319,968 | 5/1967 | Yost ................................ 277/40 |
| 3,552,752 | 1/1971 | Lojkutz ............................ 277/40 |
| 3,647,227 | 3/1972 | Lojkutz et al ................... 277/40 |

*Primary Examiner*—Richard B. Lazarus
*Attorney*—Denis A. Gross

[57] ABSTRACT

A mechanical shaft seal having a primary face seal and a secondary internal seal wherein the seal line of the secondary seal is balanced in axial alignment with the primary face seal. The seal is a take-apart seal having a housing with a brazed-in internal radial step, the housing receiving a stepped adapter having a circumferential groove therein for the secondary seal and an axial end face adapted to hold the primary face seal. The adapter is axially movable in the housing and is urged out of the housing by a spring.

2 Claims, 4 Drawing Figures

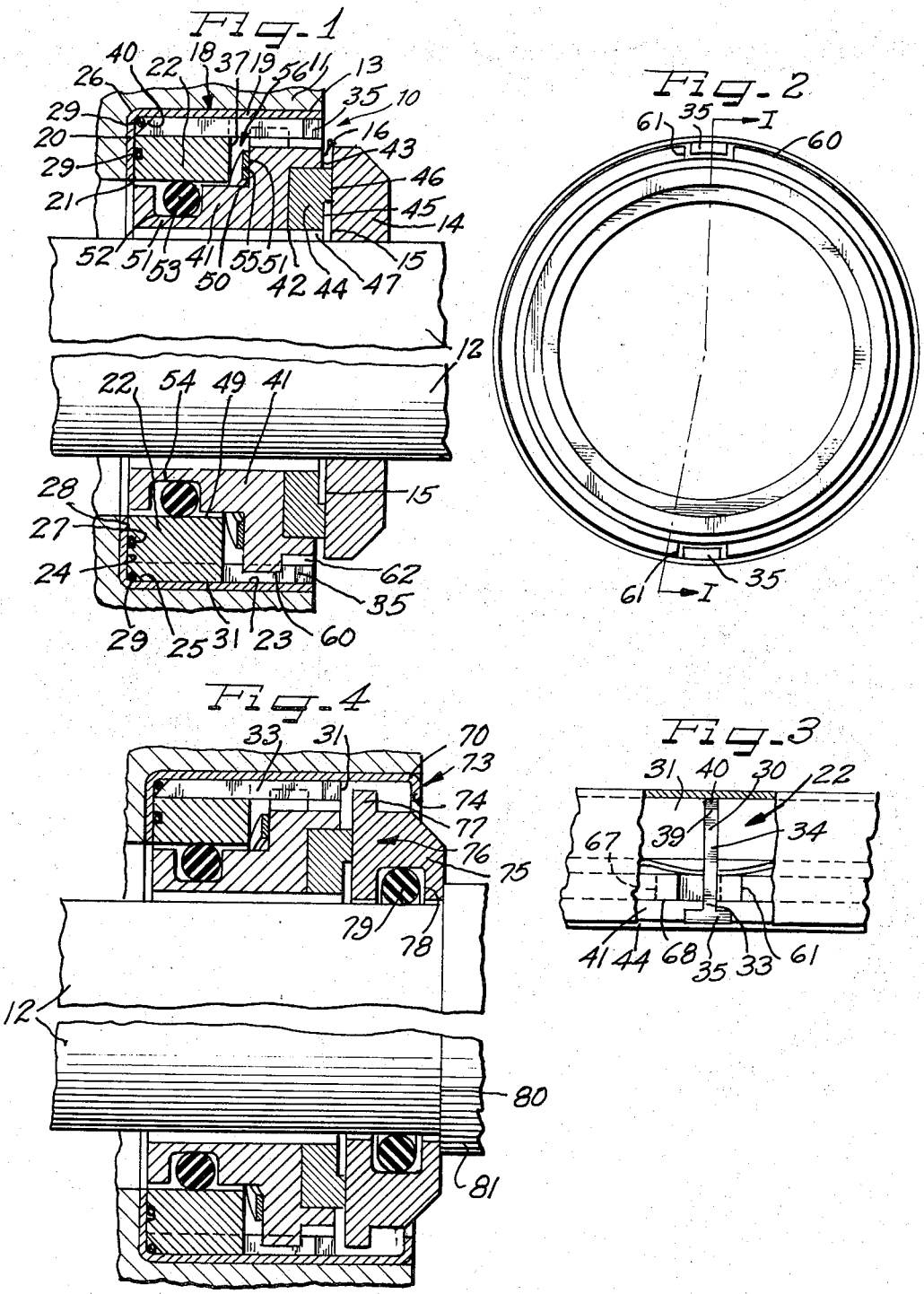

SHAFT SEAL METHOD OF MANUFACTURING

This is a continuation, division, of application Ser. No. 108,850, filed Jan. 22, 1971 now U.S. Pat. No. 3,718,336.

BACKGROUND OF THE INVENTION

1. Field of the Invention

This invention relates to shaft seals and more particularly to a take-apart balanced dual seal assembly.

2. Prior Art

Dual mechanical shaft seals are known to the art. Such seals normally include a face seal projecting from an opening of the seal housing in an axial direction and a secondary seal received in the housing to seal against pressure passage through the housing.

It has also been known to provide such seals with take-apart capabilities wherein the carrier ring and other elements can be removed from the housing or contained therein. An example of such prior art seals is the Lojkutz U.S. Pat. No. 3,552,752.

Normally, such prior art mechanical seals require a number of parts interior of the housing, and require a U-shaped cross section housing wherein the secondary seal operates against a leg of the U. This contact of the secondary seal against the leg of the U makes it difficult to provide a balanced seal wherein the sealing line of the secondary seal is on line with the centerpoint of the primary seal. It is desirable to provide a balanced seal wherein both seal lines are axially aligned. It is further oftentimes desirable to provide a seal assembly which has a cross-sectional housing shape other than a U shape to reduce the manufacturing complexity and expense of construction.

SUMMARY OF THE INVENTION

This invention overcomes the disadvantages of the prior art, and provides a mechanical dual seal shaft seal which is disassembleable.

The seal consists of a housing member which is normally constructed in a substantially L-shaped cross section with a radial wall and an axial wall. A step is provided in the seal by brazing a ring in the bottom of the housing contacting both the radial wall and a portion of the axial wall. This invention also provides a novel method of attaching the step portion to the housing. A T-shaped axially extending locking member is attached to the housing and provides a take-apart capability to the assembly.

A stepped adapter or carrying ring is received in the housing having a circumferential groove therearound in the radially narrow portion which underlies the stepped portion of the housing. The groove receives an O-ring to provide the secondary seal in contact with the inner diameter of the stepped portion of the housing. An axial end of the adapter or carrier ring receives the primary face seal which has the centerline of its contacting face aligned with the inner diameter face of the stepped portion to provide a balanced seal. A wave spring is received between the stepped portion of the housing and a radial wall on the carrier ring to urge the carrier ring out of the end of the housing. An axial groove in the carrier ring is aligned with the T-shaped member to maintain the carrier ring in the housing or by circumferential alignment of the axial groove and the T head to allow the ring to be disassembled.

In a secondary embodiment of this invention, the housing is axially extended beyond its normally open end and is provided with an inturned flange, a shaft abutting ring member is received in the extension of the housing and retained therein by the flange. The shaft abutting ring member provides a contact face for the face seal, thereby providing an entirely self-contained seal assembly.

It is therefore an object of this invention to provide an improved mechanical shaft seal.

It is a further and more specific object of this invention to provide a mechanical shaft seal having a primary face seal and a secondary internal seal, the seals balanced along an axial line.

It is another and more specific object of this invention to provide a take-apart shaft seal having balanced primary and secondary seals contained in a housing and removable therefrom, the housing having a brazed-in internal step, the inner diameter of which provides a sealing face for the secondary seal.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a fragmentary, cross-sectional view of the seal assembly of this invention received in position around a shaft.

FIG. 2 is an end plan view of the seal assembly of FIG. 1.

FIG. 3 is a fragmentary side plan view partially in section indicating the take-apart feature of the seal assembly of this invention.

FIG. 4 is a view similar to FIG. 1 illustrating a modified form of this invention.

DESCRIPTION OF THE PREFERRED EMBODIMENTS

FIG. 1 illustrates the seal assembly 10 of this invention received in a housing 11 surrounding a rotatable shaft 12. The housing 11 has a counterbore 13 therein dimensioned to receive the seal assembly and the shaft 12 has a radial projection 14 thereon presenting a radial wall 15 adapted to act as a sealing face against which the primary seal 16 of the seal assembly 10 can act.

The seal assembly 10 consists of a housing member 18 which is substantially L-shaped in cross section having an axially extending outer diameter ring wall 19 and a radially extending ring wall 20 which terminates in a central bore 21 dimensioned sufficiently large to be received around the shaft 12.

The inner dimensions of the housing 18 are provided with a radially stepped configuration by the provision of an internal adapter ring 22.

The adapter ring 22 is axially shorter than the horizontal leg 19 of the housing, and has a critical radial width as hereinafter described. The adapter ring is attached to the housing in abutting relation with the inner diameter face 23 of the horizontal wall 19 of the housing and the inner face 24 of the radial wall 20 of the housing. The adapter ring 22 is attached to the housing by a simplified manufacturing process which greatly reduces the cost of assembly. The outer corner 25 of the adapter ring which is positioned at the junction between the horizontal wall 19 and the radial wall 20 is chamfered to allow for the radius bend 26 of the housing. Further, a circumferential groove 27 may be provided in the radial wall 28 of the adapter ring which mates against the radial wall 20 of the housing. Strips of brazing material 29 are provided in the chamfered area 25 and/or the groove 27. With the brazing material received in the chamfer and/or the groove, the adapter ring is inserted into the housing in contact with the horizontal and radial walls 19 and 20 of the housing. Thereafter, the housing and adapter ring are subjected to heat, as by insertion in a furnace, sufficient to melt the brazing material received in the chamfered area or in the groove to firmly attach the adapter ring to the housing.

While attachment of the adapter ring to the housing by this method reduces the expenditure otherwise necessary in securing the adapter ring to the housing, it may be found to have an added advantage in that the use of the circumferential piece of brazing material received either in the groove or in the chamfered area provides a seal closing off any escape path which might otherwise have formed between the radial and horizontal walls of the housing and the adapter ring. Further, the provision of the brazing material in the groove or chamfered area provides a naturally restricted area to prevent undesirable flow of the heated brazing material to other areas. Because of the use of a flowable brazing material, manufacturing tolerances are not as critical as with other forms of attachment. It will of course be understood that this brazing method is a preferred embodiment, but that, however, the mechanical seal of this invention could be assembled by other techniques such as welding, riveting, adhesives, etc.

As best illustrated in FIGS. 1 and 3, a plurality of axial grooves 30 are provided in the outer diameter 31 of the spacer ring 22. T-shaped seal locking members 33 have their base legs 34 received in the grooves 30. The groove 30 is dimensioned to snugly receive the elongated base leg 34. The crossbar 35 of the locking T bars 33 is positioned at the axial end 36 of the base leg 34 which extends towards the open end of the housing 13. The base leg 34 of the locking T-bar projects axially beyond the forward or free end 37 of the spacer ring 22 to approximately the open end of the housing 13 where it terminates in the crossleg 35. The noncrossleg end 39 of the T-bar has a chamfer 40 which corresponds with the chamfer 25 of the spacer ring and which may receive the ring of brazing material 29.

In assembling the T-bar to the spacer ring, the T-bar is preferably inserted into the groove 30 prior to insertion of the spacer ring into the housing. Thereafter, the same process which adheres the spacer ring to the housing will adhere the T-bar to the spacer ring and housing.

Received within the housing 13 is an adapter or carrier ring 41 which has a counterbore 42 in the front end 43 thereof which carries a seal ring 44 which may be of carbon or like seal materials. The seal ring 44 also has a counterbore 45 which provides a sealing face 46 radially spaced outward from the central opening 47 of the seal ring 44 and carrier 41.

The seal ring 44 provides the primary seal at the interface between the sealing face 46 and the radial wall 15 of the shaft-carried abutment 14. The radial centerline of the sealing face 46 provides an axial line along which should rest the sealing face of the secondary seal in order to provide a balanced pressure seal. In most prior art dual mechanical shaft seals, the housing 13 has an inner diameter axially extending wall extending towards the open front end from the back wall a short distance. The secondary seal then is provided between the carrier ring or adapter and the outer diameter face of the inner diameter leg of the housing. The formation of such housing requires deep draw procedures which are expensive and complicated. The present invention avoids these by the use of an L-shaped housing which receives the spacer ring 22. Thus, the inner diameter face 49 of the spacer ring is dimensioned to lie on the axial line of the centerpoint of the primary sealing face 46. Therefore, the secondary seal can be along the inner diameter 49 of the spacer ring 22 and provide a balanced seal. For this reason, the adapter 41 is stepped as at 50 to provide a radially narrower portion 51 underlying the spacer ring 22. A circumferential groove 52 in the radially narrow portion 51 receives an O-ring 53 which will abut the bottom 54 of the groove 52 and the inner diameter face 49 of the spacer ring 22 to provide the secondary seal.

The adapter ring 41 is free to move in the housing in an axial direction and to a lesser extent, in a radial direction. In order to accommodate the axial movement, the circumferential groove 52 may be axially longer than the diameter of the O-ring 53 to allow the O-ring 53 to roll in the groove to accommodate axial movement of the adapter ring with respect to the spacer ring 22. A wave spring 55 may be received in the space 56 between the front wall 37 of the spacer ring 22 and the back wall 57 of the non-stepped portion of the adapter or carrier ring. The wave spring will continuously urge the carrier ring towards the front or open end of the housing whereby the primary seal 44 will have its sealing face 46 pressed against the shaft-carried abutment member 14.

Circumferentially spaced around the outer diameter 60 of the non-stepped portion of the adapter ring are axial grooved 61 corresponding in number and angular displacement to the T-bars 34. The grooves 61 are wider than the crossbar 35 of the T-bars 34 and have a radial depth slightly greater than the radial dimension of the crossbar.

The outer diameter face 60 of the adapter or carrier ring 41 may be stepped so as to provide a ledge 61 in the area of the grooves 61. The carrier ring is pressed into the housing with the grooves 61 aligned with the crosshead 35 of the T-bar 34 as illustrated in FIG. 3. Thereafter, the carrier ring may be circumferentially rotated until the grooves 61 are positioned as indicated by the dotted lines 67 of FIG. 3. Thereafter, releasing the compressive pressure on the carrier ring will allow it to move outward into abutting relation with the crossbar of the T-bar to retain it within the housing. In this manner, a take-apart seal is provided which can easily be disassembled merely by rotating the carrier ring until the grooves 61 are aligned with the T-bar. When the seal assembly is mounted on the shaft, the carrier ring is rotated in the direction of rotation of the shaft to provide a lock which will not thereafter release due to rotational influence of the shaft on the stationary seal.

During normal operation of the seal, the carrier ring may be pressed against the wave spring to compress it to such a point that the abutment face 68 of the front of the carrier ring which normally abuts the T-bar is moved axially further inward from the crosshead of the T-bar. This does not affect the locking provision inasmuch as the rotation of the shaft will tend to press the side wall of the grooves 61 up against the axial leg 34 of the T-bar. In this way, the carrier ring is retained in the housing while still allowing axial movement of both the primary and secondary seals with respect to the seal assembly housing. Further, the T-bar-groove abutment prevents rotation of the carrier ring.

FIG. 4 illustrates a modified form of this invention constructed in substantially the same manner as the embodiments of FIGS. 1 through 3. In the modified form of FIG. 4, the housing outer diameter wall 70 is axially extended beyond the crosshead 71 of the T-bar 33. The front end 73 of the housing terminates in a radially inturned lip 74. A sealing face defining abutment member 75 is received in the extended portion of the housing, and includes a body portion 76 of ring configuration having a radially extending portion 77 which extends radially outward from the shaft 12 to a distance greater than the termination point of the inturned lip 74 whereby the body portion 76 will be maintained interior of the housing. The body portion 76 has an inner diameter groove 78 which may receive an O-ring seal 79 to place the body portion in sealing engagement with the shaft 12 with which it will rotate. An additional radial projection 80 of the shaft 12 may contact the forward face 81 of the body portion 76, and indexing lugs may be provided to firmly attach the body portion 76 to the shaft for rotation therewith. Alternatively, the body portion 76 may be received around the shaft with sole contact therewith including the O-ring and/or the abutment between the radial abutment 80 and the front face 81, whereby the possibility of rotation between the body portion 76 and the shaft may in certain embodiments be allowed.

It will therefore be appreciated from the above that our invention provides a mechanical shaft seal having primary and secondary seals which have their sealing faces axially aligned to provide a balanced seal. The seal assembly includes a housing having an outer wall and at least one radial wall, the housing receiving therein a brazed-end spacer ring partially filling a portion of the housing to provide a stepped internal axial wall, the ring providing a sealing face for the secondary seal on line with the centerpoint of the primary seal.

Although the teachings of our invention have herein been discussed with reference to specific theories and embodiments, it is to be understood that these are by way of illustration only and that others may wish to utilize our invention in different designs or applications.

We claim as our invention:

1. The method of manufacturing a shaft seal having a radially stepped internal configuration which comprises the steps of: forming a shaft seal housing member having a ring configuration with an axially extending outer diameter wall and a radial wall intersecting with one end of the axial wall, providing a ring member having an outer diameter substantially equal to the inner diameter of the axially extending wall, the ring member having a radial wall, providing at least one circumferential groove in a surface of the said ring member, providing a brazing material in the said groove, inserting said ring member into the said housing member whereby the radial wall of the said ring member abuts a surface of the radial wall of the said housing member and the outer diameter of the said ring member abuts the inner diameter surface of the said axial wall with the said groove being in at least one of the abutting faces, subjecting the resultant assembly to heat sufficient to melt the brazing material to braze the said ring to the said housing member, at least one axial groove formed in the outer diameter of the said ring prior to insertion into the said housing, and the leg of an anti-rotation locking bar snuggly received in the said groove, the said anti-rotation locking bar inserted into the said groove prior to insertion of the ring into the said housing.

2. The method of manufacturing a shaft seal having a radially stepped internal configuration which comprises the steps of: forming a shaft seal housing member having a ring configuration with an axially extending outer diameter wall and a radial wall intersecting with one end of the axial wall, providing a ring member having an outer diameter substantially equal to the inner diameter of the axially extending wall, the ring member having a radial wall, providing at least one circumferential groove in a surface of the said ring member, providing a brazing material in the said groove, inserting said ring member into the said housing member whereby the radial wall of the said ring member abuts a surface of the radial wall of the said housing member and the outer diameter of the said ring member abuts the inner diameter surface of the said axial wall with the said groove being in at least one of the abutting faces, subjecting the resultant assembly to heat sufficient to melt the brazing material to braze the said ring to the said housing member at least one axial groove formed in the outer diameter of the ring prior to insertion into the housing, the base leg of a T-shaped bar snuggly received in the groove with the cross head of the T bar axially spaced from the said ring, the said T bar inserted into the groove prior to insertion of the ring into the housing, the circumferential groove positioned such that the melting of the brazing material therein will braze the T bar to the ring and to the housing.

* * * * *